US010644577B2

(12) United States Patent
Chen et al.

(10) Patent No.: US 10,644,577 B2
(45) Date of Patent: May 5, 2020

(54) ROTOR AND MOTOR HAVING ROTOR

(71) Applicant: SHENZHEN GAM SHINE TECHNOLOGY CO., LIMITED, ShenZhen (CN)

(72) Inventors: Kenny Chen, Guangdong Province (CN); Huiming Zhang, Guangdong Province (CN)

(73) Assignee: SHENZHEN GAM SHINE TECHNOLOGY CO., LIMITED, Shenzhen, Guangdong Province (CN)

( * ) Notice: Subject to any disclaimer, the term of this patent is extended or adjusted under 35 U.S.C. 154(b) by 394 days.

(21) Appl. No.: 15/565,261

(22) PCT Filed: May 20, 2015

(86) PCT No.: PCT/CN2015/079349
§ 371 (c)(1),
(2) Date: Oct. 9, 2017

(87) PCT Pub. No.: WO2016/161693
PCT Pub. Date: Oct. 13, 2016

(65) Prior Publication Data
US 2018/0083518 A1 Mar. 22, 2018

(30) Foreign Application Priority Data
Apr. 9, 2015 (CN) .......................... 2015 1 0166167

(51) Int. Cl.
*H02K 16/02* (2006.01)
*H02K 1/16* (2006.01)
(Continued)

(52) U.S. Cl.
CPC ............... *H02K 16/02* (2013.01); *H02K 1/16* (2013.01); *H02K 1/276* (2013.01); *H02K 1/28* (2013.01);
(Continued)

(58) Field of Classification Search
CPC .......... H02K 16/02; H02K 1/16; H02K 1/276; H02K 1/28; H02K 3/28; H02K 21/14; H02K 2201/06
See application file for complete search history.

(56) References Cited

U.S. PATENT DOCUMENTS

| 6,876,115 | B2* | 4/2005 | Takahashi | H02K 29/03 |
| | | | | 310/156.47 |
| 2015/0026966 | A1* | 1/2015 | Fang | H02K 1/276 |
| | | | | 29/598 |
| 2017/0264151 | A1* | 9/2017 | Suzuki | H02K 1/272 |

FOREIGN PATENT DOCUMENTS

| CN | 1551462 A | 12/2004 |
| CN | 102005883 A | 4/2011 |

(Continued)

*Primary Examiner* — Emily P Pham
(74) *Attorney, Agent, or Firm* — Tarolli, Sundheim, Covell & Tummino LLP

(57) ABSTRACT

The present invention provides a kind of rotor and a motor with the rotor. The rotor comprises a shaft, a magnetic yoke of rotor, several primary permanent magnet groups and several secondary permanent magnet groups. The said several primary permanent magnet groups and the said several secondary permanent magnet groups are alternatively distributed along the circumference of the said magnetic yoke of rotor at the same interval. The projection of the said primary permanent magnet group and that of the said secondary permanent magnet group on a plane vertical to the said shaft are adjacent, and their edges overlap. The present invention can reduce torque pulsation caused by the electromagnetic factors, and increase the external work of torque. Therefore, it has good effects on improving power efficiency of the motor and saving energy.

9 Claims, 4 Drawing Sheets

(51) Int. Cl.
*H02K 1/27* (2006.01)
*H02K 1/28* (2006.01)
H02K 3/28 (2006.01)
H02K 21/14 (2006.01)

(52) U.S. Cl.
CPC ............... *H02K 3/28* (2013.01); *H02K 21/14* (2013.01); *H02K 2201/06* (2013.01)

(56) References Cited

FOREIGN PATENT DOCUMENTS

| | | |
|---|---|---|
| CN | 103141010 A | 5/2013 |
| CN | 103618393 A | 3/2014 |
| CN | 104380572 A | 2/2015 |
| EP | 1447901 A2 | 8/2004 |

\* cited by examiner

ROTOR AND MOTOR HAVING ROTOR

RELATED APPLICATION

The present invention is a U.S. National Stage under 35 U.S.C. 371 patent application, claiming priority to PCT International Application No. PCT/CN2015/079349, filed 20 May 2015; which claims priority from Chinese Patent Application No. 201510166167.X, filed 9 Apr. 2015, the subject matter of each of which is incorporated herein by reference in its entirety.

TECHNICAL FIELD

The present invention relates to the electromagnetic field, in particular a rotor and motor with the rotor.

BACKGROUND

Due to electromagnetic factors, the influence of tooth space, current commutation, inductive reaction and others of the brushless permanent magnet brushless motor with the existing technology, a strong pulsating torque is produced. The torque pulsation caused by electromagnetic factors is the torque pulsation due to the interaction between stator current and rotor magnetic field, which is directly related to current waveform, counter EMF waveform and air gap flux density. Under ideal conditions, the stator current is square wave, the counter EMF waveform is trapezoidal, the flat-top width is 120° electrical angle, and the electromagnetic torque is constant. In the actual motor, because of the reason of design and manufacturing, the counter EMF waveform may not be trapezoidal wave, and the flat-top width may not be 120° electrical angle, which will cause the torque pulsation of the motor. Due to the existing of iron core groove tooth of the stator, the torque pulsation caused by tooth space makes the air-gap permeance on the surface of the permanent magnet and the corresponding stator not uniform. When the rotor rotates, in a state the magnetic circuit reluctance changes, thus causing the torque pulsation. Thus, the use of electric energy by the motor is not efficient.

SUMMARY

In view of the low efficiency of electric energy utilization by the motor caused by the torque pulsation in the existing technology, a rotor and a motor with the rotor are provided.

The present invention uses the following technical means to solve the technical problems. A rotor is provided, comprising a shaft, a magnetic yoke of rotor, several primary permanent magnet groups and several secondary permanent magnet groups. The said several primary permanent magnet groups and the said several secondary permanent magnet groups are alternatively distributed along the circumference of the said magnetic yoke of rotor at the same interval. The projection of the said primary permanent magnet group and that of the said secondary permanent magnet group on a plane vertical to the said shaft are adjacent, and their edges overlap;

The said magnetic yoke of rotor comprises the first magnetic yoke of rotor, the second magnetic yoke of rotor, and the third magnetic yoke of rotor connected to the said shaft in turn. Each said primary permanent magnet group and each said secondary permanent magnet group comprises the primary permanent magnet set on the said first magnetic yoke of rotor, the secondary permanent magnet set on the said second magnetic yoke of rotor, and the tertiary permanent magnet set on the said third magnetic yoke of rotor, respectively; the magnetic poles of adjacent two said primary permanent magnets facing the said shaft have different names, the magnetic poles of adjacent two said secondary permanent magnets facing the said shaft have different names, and the magnetic poles of adjacent two said tertiary permanent magnets facing the said shaft have different names;

The magnetic poles of the primary permanent magnet and the tertiary permanent magnet of the said primary permanent magnet group and the secondary permanent magnet of the said primary permanent magnet group facing the said shaft have different names, respectively. The projection of the primary permanent magnet, the secondary permanent magnet and the tertiary permanent magnet on the said plane are adjacent in turn;

The magnetic poles of the primary permanent magnet and the tertiary permanent magnet of the said secondary permanent magnet group and the secondary permanent magnet of the said secondary permanent magnet group facing the said shaft have different names, respectively. The projection of the primary permanent magnet, the secondary permanent magnet and the tertiary permanent magnet on the said plane are adjacent in turn.

In the rotor provided by the present invention, edges of projection of the primary permanent magnet, the secondary permanent magnet and the tertiary permanent magnet of the said primary permanent magnet group on the said plane coincide with each other in turn.

In the rotor provided by the present invention, edges of projection of the primary permanent magnet, the secondary permanent magnet and the tertiary permanent magnet of the said secondary permanent magnet group on the said plane coincide with each other in turn.

In the rotor provided by the present invention, several slots matched with the primary permanent magnet, the secondary permanent magnet and the tertiary permanent magnet are set in the same position with the same distance from the said shaft on the said first magnetic yoke of rotor, the said second magnetic yoke of rotor and the said third magnetic yoke of rotor, respectively. Each said slot extends in the direction parallel to the said shaft.

In the rotor provided by the present invention, the said primary permanent magnet, the said secondary permanent magnet and the said tertiary permanent magnet are rectangular or square.

In the rotor provided by the present invention, the cross section of the said primary permanent magnet, the said secondary permanent magnet and the said tertiary permanent magnet is arc-shaped cylinder. When the said primary permanent magnet, the said secondary permanent magnet and the said tertiary permanent magnet are installed in the corresponding slot, respectively, the center of circle of the cross section of the said primary permanent magnet, the said secondary permanent magnet and the said tertiary permanent magnet is located on the axis of the said shaft.

In the rotor provided by the present invention, the said shaft comprises the cylindrical main body and several flange ribs set on the side wall of the said main body, each said flange rib extends in the direction parallel to the axis of the main body, and the said several flange ribs are uniformly distributed along the circumference of the said main body;

Along the axis of the said magnetic yoke of rotor, a cylindrical through hole is set. On the side wall corresponding to the said through hole, several slots are set. The said main body is in the said through hole. The said several flange ribs are embedded in the said several slots.

In the rotor provided by the present invention, the said first magnetic yoke of rotor, the said second magnetic yoke of rotor and the said third rotor magnetic yoke of rotor are bonded together by insulation paste.

The present invention also provides a multiphase motor. It comprises a chute stator and the said rotor of any above item. The said chute stator comprises a multiphase excitation coil and a stator core. The said stator core is provided with helical teeth winding the said multiphase excitation coil. Between the said helical teeth, a chute on the side of the said multiphase excitation coil is formed.

The present invention has the following effects. Due to the arrangement of the primary permanent magnet group and secondary permanent magnet group of the present invention, when the primary permanent magnet group and the secondary permanent magnet group enter the electromagnetic field generated by chute stator, the resistance is smaller; because the secondary permanent magnet of each permanent magnet group has opposite polar with the primary permanent magnet and the tertiary permanent magnet of the group, in the rotating process the secondary permanent magnet feeds back electric energy to the power supply; due to the cooperation between chute stator and stepped rotor, air gaps on the surface of the stator are uniform, the rotor is smoother, the torque is bigger, and the pulsation torque can be eliminated, so it has the good effect of improving power efficiency of the motor and saving energy.

BRIEF DESCRIPTION OF THE DRAWINGS

A further description of the present invention will be provided in conjunction with the drawings and embodiments. In the drawings.

DESCRIPTION OF ASPECTS OF THE DISCOLSURE

Figure 1:
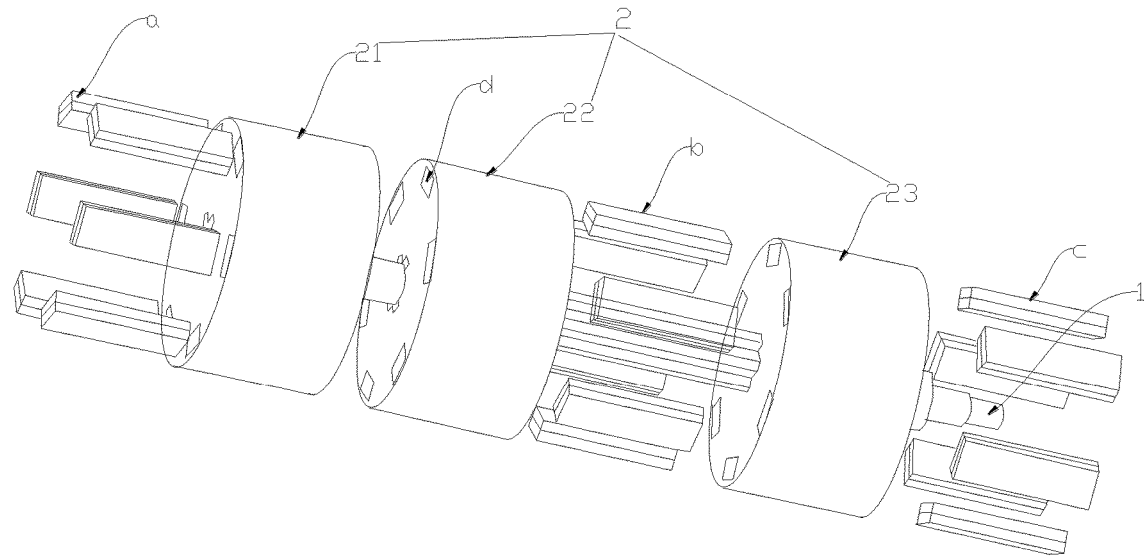
FIG. 1 illustrates a schematic view of the decomposition structure of rotor in a preferred embodiment of the present invention.
Figure 2:
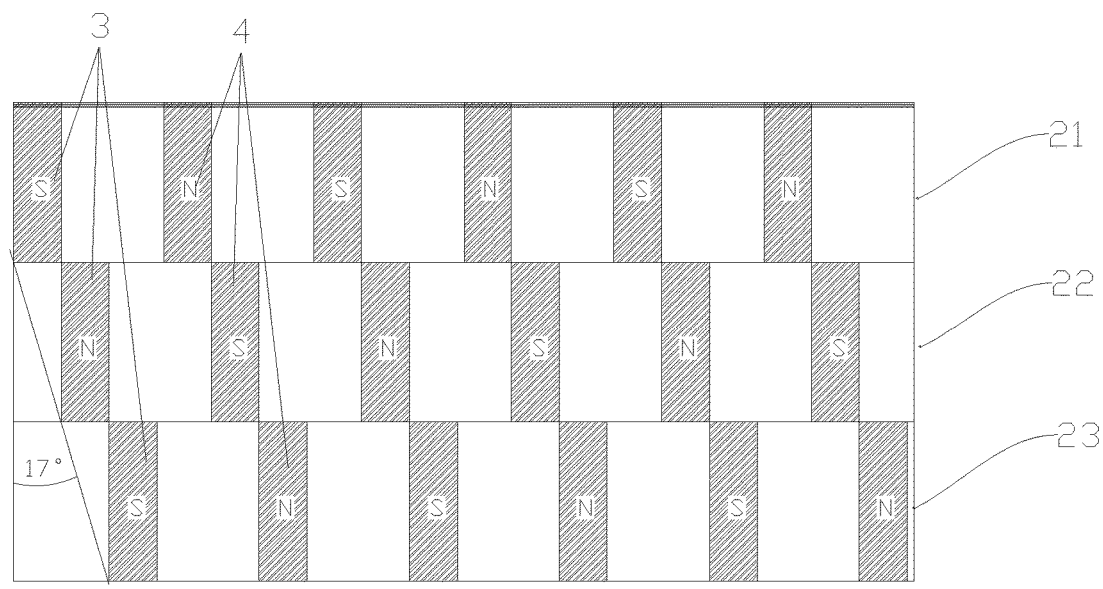
FIG. 2 illustrates a schematic view of the arrangement of permanent magnets when the side wall of the rotor in the embodiment in FIG. 1 is unfolded into a plane.

FIG. 1 shows the rotor in the first embodiment of the present invention, which is mainly used to form the electric motor with the chute stator. Referring to FIG. 2, the rotor comprises shaft 1, magnetic yoke of rotor 2, several primary permanent magnet groups 3, and several secondary permanent magnet groups 4. Several primary permanent magnet groups 3 and several secondary permanent magnet groups 4 are alternatively distributed along the circumference of the said magnetic yoke of rotor 2 at the same interval. The projection of the primary permanent magnet group 3 and that of the secondary permanent magnet group 4 on a plane vertical to the said shaft 1 are adjacent, and their edges overlap.

The magnetic yoke of rotor 2 is approximately cylindrical. It comprises the first magnetic yoke of rotor 21, the second magnetic yoke of rotor 22 and the third rotor magnetic yoke of rotor 23 connected to shaft 1 in turn. The first magnetic yoke of rotor 21, the second magnetic yoke of rotor 22 and the third rotor magnetic yoke of rotor 23 are bonded together by insulation paste. The primary permanent magnet group 3 and the secondary permanent magnet group 4 are both stair-stepping. Each primary permanent magnet group 3 and each secondary permanent magnet group 4 comprises the primary permanent magnet a set on the said first magnetic yoke of rotor 21, the secondary permanent magnet b set on the said second magnetic yoke of rotor 22, and the tertiary permanent magnet c set on the said third magnetic yoke of rotor 23, respectively. Magnetic poles of the primary permanent magnet a, the secondary permanent magnet b and the tertiary permanent magnet c are all distributed radically along the magnetic yoke of rotor 2, and the size and shape are identical. The magnetic poles of adjacent two primary permanent magnets a facing the shaft 1 have different names, the magnetic poles of adjacent two secondary permanent magnets b facing the shaft 1 have different names, and the magnetic poles of adjacent two tertiary permanent magnets c facing the shaft 1 have different names.

Further, the magnetic poles of the primary permanent magnet a and the tertiary permanent magnet c of the primary permanent magnet group 3 and the secondary permanent magnet b of the primary permanent magnet group 3 facing the shaft 1 have different names, respectively. The projection of the primary permanent magnet a, the secondary permanent magnet b and the tertiary permanent magnet c on the plane are adjacent in turn; the magnetic poles of the primary permanent magnet a and the tertiary permanent magnet c of the secondary permanent magnet group 4 and the secondary permanent magnet b of the secondary permanent magnet group 4 facing the shaft 1 have different names, respectively. The projection of the primary permanent magnet a, the secondary permanent magnet b and the tertiary permanent magnet c on the plane are adjacent in turn. The cross section of the primary permanent magnet a, the secondary permanent magnet b and the tertiary permanent magnet c of each permanent magnet group in the radial direction vertical to the first magnetic yoke of rotor 2 is rectangular or square.

When the magnetic field generated by the primary permanent magnet group 3 or the secondary permanent magnet group 4 in the embodiment enters the magnetic field generated by the multiphase excitation coil of the chute stator, because the chute stator is an inclined chute and the primary permanent magnet group 3 or the secondary permanent magnet group 4 are stair-stepping, when the primary permanent magnet a, the secondary permanent magnet b and the tertiary permanent magnet c enter the magnetic field generated by the multiphase excitation coil with an oblique angle, the resistance the magnetic field generated by the excitation coil for each permanent magnet group can be reduced. When the primary permanent magnet group 3 or the secondary permanent magnet group 4 gradually enters the magnetic field generated by the multiphase excitation coil of the chute stator, the interacting magnetic field lines increase, and the thrust of the multiphase excitation coil for the rotor increases. Moreover, due to the cooperation between chute stator and the primary permanent magnet group 3 and the secondary permanent magnet group 4, air gaps on the surface of the stator are uniform, the rotor is smoother, the torque is bigger, and the pulsation torque can be eliminated, so it has the good effect of improving power efficiency of the motor and saving energy.

Because in the same permanent magnet group the secondary permanent magnet b in the middle has the opposite pole with the primary permanent magnet a above and the tertiary permanent magnet c below, which can inhibit the eddy current loss and heat during operation of the motor, feel back power to the power supply, and save electric energy.

Preferably, edges of projection of the primary permanent magnet a, the secondary permanent magnet b and the tertiary permanent magnet c of each primary permanent magnet group 3 on the plane vertical to shaft 1 coincide with each other in turn, which can further improve the magnetism of the secondary permanent magnet b in each primary permanent magnet group 3, the rotational torque, and the utilization efficiency of the electric energy. In this embodiment, edges of projection of the primary permanent magnet a, the secondary permanent magnet b and the tertiary permanent magnet c of the secondary permanent magnet group 4 on the plane coincide with each other in turn, which can further increase the rotational torque of the secondary permanent magnet b in each first and secondary permanent magnet group 4, so as to improve the utilization efficiency of the electric energy. The primary permanent magnet a, the secondary permanent magnet b and the tertiary permanent magnet c the same size and shape is the best embodiment.

Figure 3:
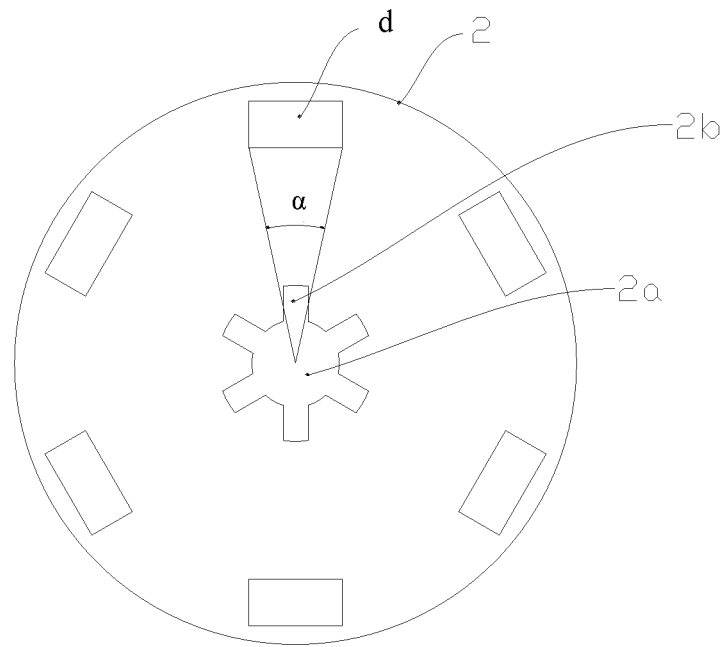
FIG. 3 illustrates a top view of the magnetic yoke of rotor in the embodiment in FIG. 1.

Specifically, several slots d matched with the primary permanent magnet a, the secondary permanent magnet b and the tertiary permanent magnet c are set in the same position with the same distance from the said shaft 1 on the first magnetic yoke of rotor 21, the second magnetic yoke of rotor 22 and the third magnetic yoke of rotor 23, respectively. Each said slot d extends in the direction parallel to the shaft 1. The primary permanent magnet a, the secondary permanent magnet b and the tertiary permanent magnet c are all cuboid or cubic. Correspondingly, as shown in FIG. 3, slot d is also cuboid or cubic.

In this embodiment, the shaft 1 comprises the cylindrical main body (not shown) and several flange ribs on the side wall of the main body, each flange rib extends in the direction parallel to the axis of the main body, and several flange ribs are uniformly distributed along the circumference of the main body. As shown in FIG. 3, along the axis of the magnetic yoke of rotor 2, a cylindrical through hole 2a is set. On the side wall corresponding to the said through hole 2a, several slots 2b are set. The main body is in the through hole 2a. The several flange ribs are embedded in several slots 2b. It can prevent the rotation of shaft 1 relative to the magnetic yoke of rotor 2, and better control the relative position of the first magnetic yoke of rotor 21, the second magnetic yoke of rotor 22 and the third magnetic yoke of rotor 23 in the circumferential direction for convenience of the installation.

Figure 4:
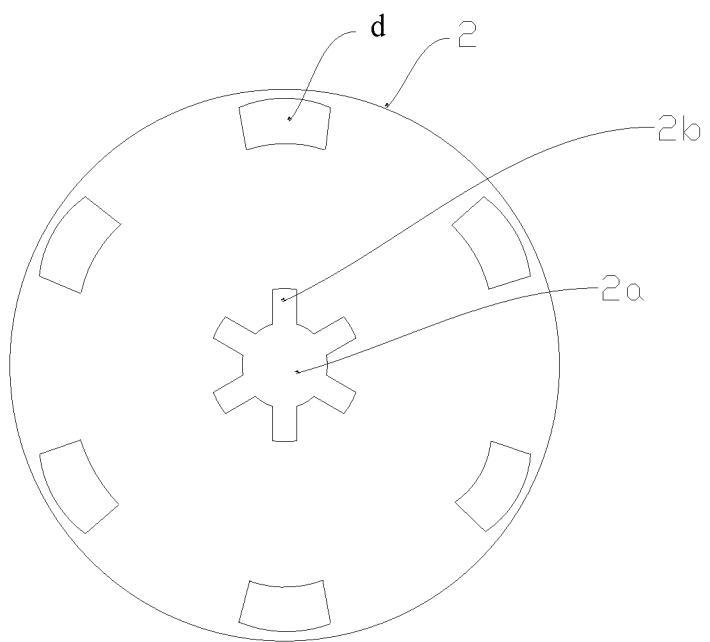
FIG. 4 illustrates a top view of the magnetic yoke of rotor in another embodiment.

Undoubtedly, the said primary permanent magnet a, the said secondary permanent magnet b and the said tertiary permanent magnet c can be cylinder with arc-shaped cross section, respectively. When the primary permanent magnet a, the secondary permanent magnet b and the tertiary permanent magnet c are installed in the corresponding slot d, respectively, the center of circle of the cross section of the primary permanent magnet a, the secondary permanent magnet b and the tertiary permanent magnet c is located on the axis of the shaft 1. Correspondingly, as shown in FIG. 4, the cross section of slot d is also arc-shaped. The use of the permanent magnet with such shape can further improve the power consuming efficiency of the motor.

Figure 5:
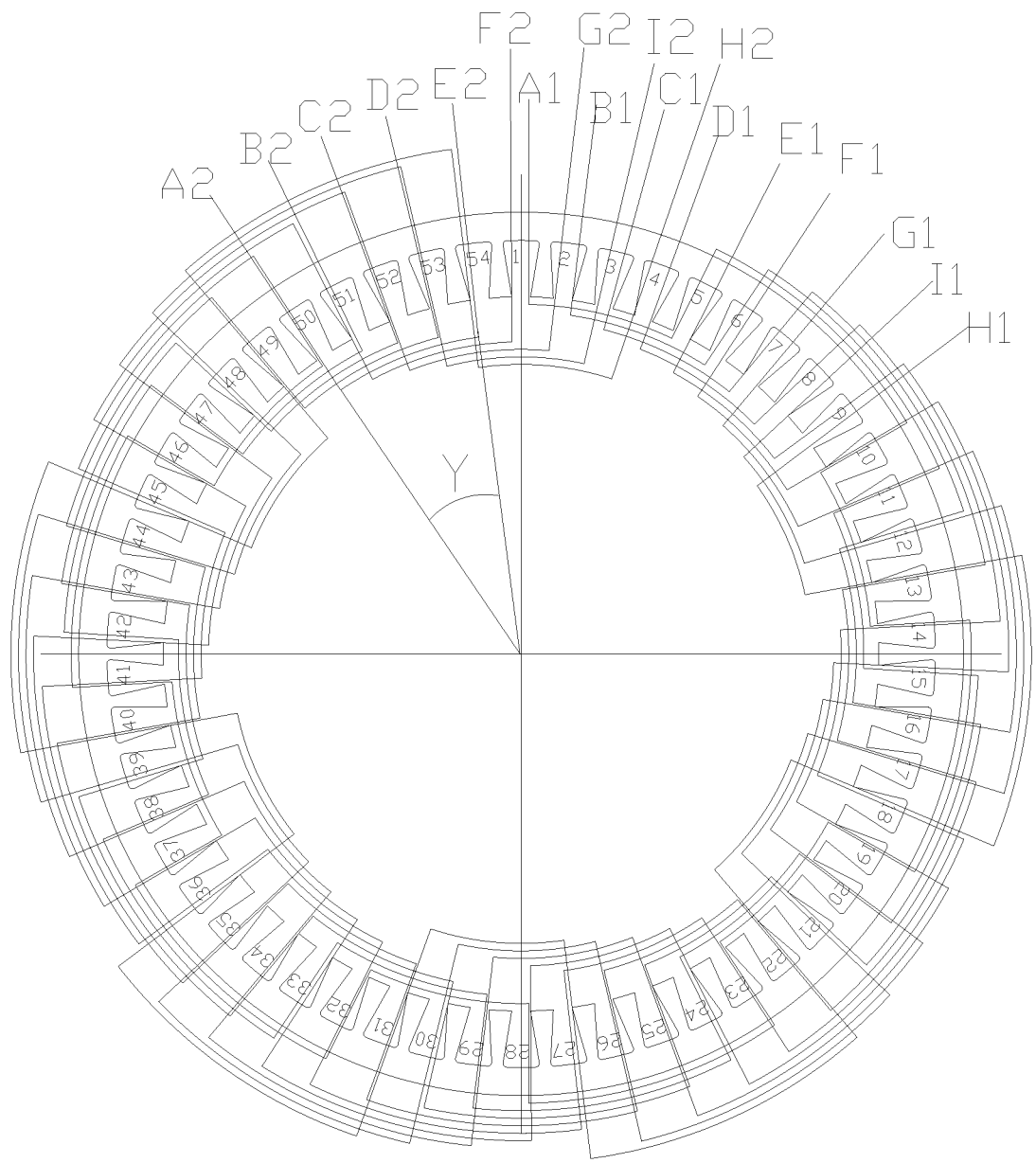
FIG. 5 illustrates a schematic view of the structure of the chute stator wound with an A-phase excitation coil in an embodiment.
Figure 6:
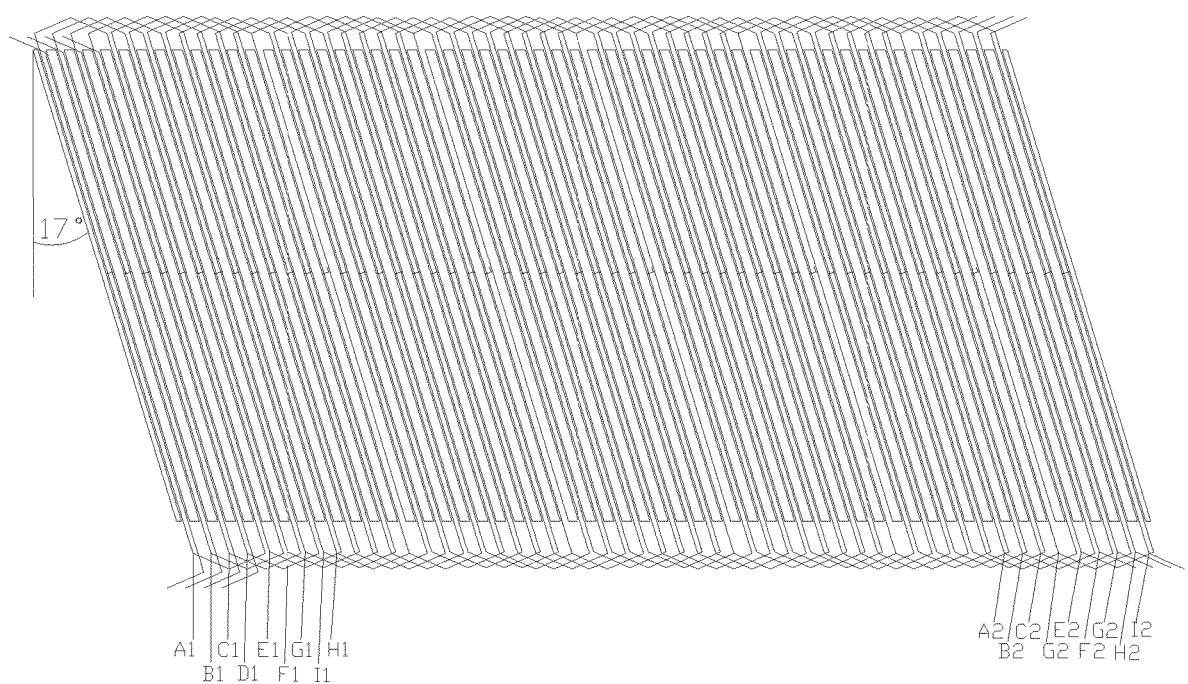
FIG. 6 illustrates a schematic view of the structure of the chute stator wound with an A-phase excitation coil after unfolding in the embodiment in FIG. 5.

The present invention also provides a multiphase chute motor, which comprises a chute stator and the rotor in the above embodiment. The chute stator comprises a multiphase excitation coil and an iron core of stator. The iron core of stator is provided with helical teeth for the winding of multiphase excitation coil. Between the helical teeth, a chute on the side of the multiphase excitation coil is formed. FIG. 5 illustrates a schematic view of the winding of A-phase excitation coil in the multiphase excitation coil. Other phases of excitation coil are wound at the interval of a certain number of helical chutes according to the ordering requirements. At the same time, referring to FIG. 3, the central angle Y of a pole of the A phase excitation coil is approximately equal to the central angle α of each primary permanent magnet a, secondary permanent magnet b, and tertiary permanent magnet c on the rotor. Referring to FIG. 2 and FIG. 6, the inclination angle of the chute is the same as that of the primary permanent magnet group and the secondary permanent magnet group. In this embodiment, they are all 17 degrees.

It should be understood that for ordinary technical personnel in the field, the embodiment of the invention is described combined with the drawings above. However, the present invention is not limited to the specific embodiment. The above specific implementation is only schematic, rather than limiting. Enlightened by the present invention, the ordinary technical personnel in the field can also create a lot of forms without departing from the scope protected by the purpose and claim of the present invention, which are within the scope of protection of the present invention.

We claim:

1. A rotor, comprising a shaft, a magnetic yoke of rotor, several primary permanent magnet groups and several secondary permanent magnet groups, the several primary permanent magnet groups and the several secondary permanent magnet groups are alternatively distributed along a circumference of the magnetic yoke of rotor at a same interval, a projection of the primary permanent magnet group and that of the secondary permanent magnet group on a plane vertical to the shaft are adjacent, and their edges overlap;

the magnetic yoke of rotor comprises a first magnetic yoke of rotor, a second magnetic yoke of rotor, and a third magnetic yoke of rotor connected to the shaft in turn, each said primary permanent magnet group and each said secondary permanent magnet group comprises a primary permanent magnet set on the first magnetic yoke of rotor, a secondary permanent magnet set on the second magnetic yoke of rotor, and a tertiary permanent magnet set on the third magnetic yoke of rotor, respectively; magnetic poles of adjacent two said primary permanent magnets facing the shaft have different names, magnetic poles of adjacent two said secondary permanent magnets facing the shaft have different names, and magnetic poles of adjacent two said tertiary permanent magnets facing the shaft have different names;

the magnetic poles of the primary permanent magnet and the tertiary permanent magnet of the primary permanent magnet group and the secondary permanent magnet of the primary permanent magnet group facing the shaft have different names, respectively, projections of the primary permanent magnet, the secondary permanent magnet and the tertiary permanent magnet on the plane are adjacent in turn;

the magnetic poles of the primary permanent magnet and the tertiary permanent magnet of the secondary permanent magnet group and the secondary permanent magnet of the secondary permanent magnet group facing the shaft have different names, respectively, the projections of the primary permanent magnet, the secondary permanent magnet and the tertiary permanent magnet on the plane are adjacent in turn.

2. The rotor of claim 1, wherein edges of projection of the primary permanent magnet, the secondary permanent magnet and the tertiary permanent magnet of the primary permanent magnet group on the plane coincide with each other in turn.

3. The rotor of claim 2, wherein edges of projection of the primary permanent magnet, the secondary permanent magnet and the tertiary permanent magnet of the secondary permanent magnet group on the plane coincide with each other in turn.

4. The rotor of claim 1, wherein several slots matched with the primary permanent magnet, the secondary permanent magnet and the tertiary permanent magnet are set in the same position with the same distance from the shaft on the first magnetic yoke of rotor, the second magnetic yoke of rotor and the third magnetic yoke of rotor, respectively, each said slot extends in a direction parallel to the shaft.

5. The rotor of claim 4, wherein the said primary permanent magnet, the secondary permanent magnet and the tertiary permanent magnet are rectangular or square.

6. The rotor of claim 4, wherein the primary permanent magnet, the secondary permanent magnet and the tertiary permanent magnet are cylinders with arc-shaped cross section, when the primary permanent magnet, the secondary permanent magnet and the tertiary permanent magnet are installed in the corresponding slot respectively, the centers of circle of the arc-shaped cross section of the primary permanent magnet, the secondary permanent magnet and the tertiary permanent magnet are located on an axis of the shaft.

7. The rotor of claim 6, wherein the shaft comprises cylindrical main body and several flange ribs set on a side wall of the cylindrical main body, each said flange rib extends in the direction parallel to an axis of the cylindrical main body, and the several flange ribs are uniformly distributed along a circumference of the cylindrical main body; along an axis of the magnetic yoke of rotor, a cylindrical through hole is set on the side wall corresponding to the cylindrical through hole, several slots are set, the cylindrical main body is in the cylindrical through hole, the several flange ribs are embedded in the several slots.

8. The rotor of claim 1, wherein the first magnetic yoke of rotor, the second magnetic yoke of rotor and the third rotor magnetic yoke of rotor are bonded together by insulation paste.

9. A kind of multiphase motor, comprising a chute stator and the rotor of claim 1, the chute stator comprises a multiphase excitation coil and a stator core, the stator core is provided with helical teeth for a winding of the multiphase excitation coil, between the helical teeth, a chute on a side of the multiphase excitation coil is formed.

* * * * *